INVENTOR.
JOHN H. SWARTZ
BY
Frank G. Bruce
his ATTORNEY

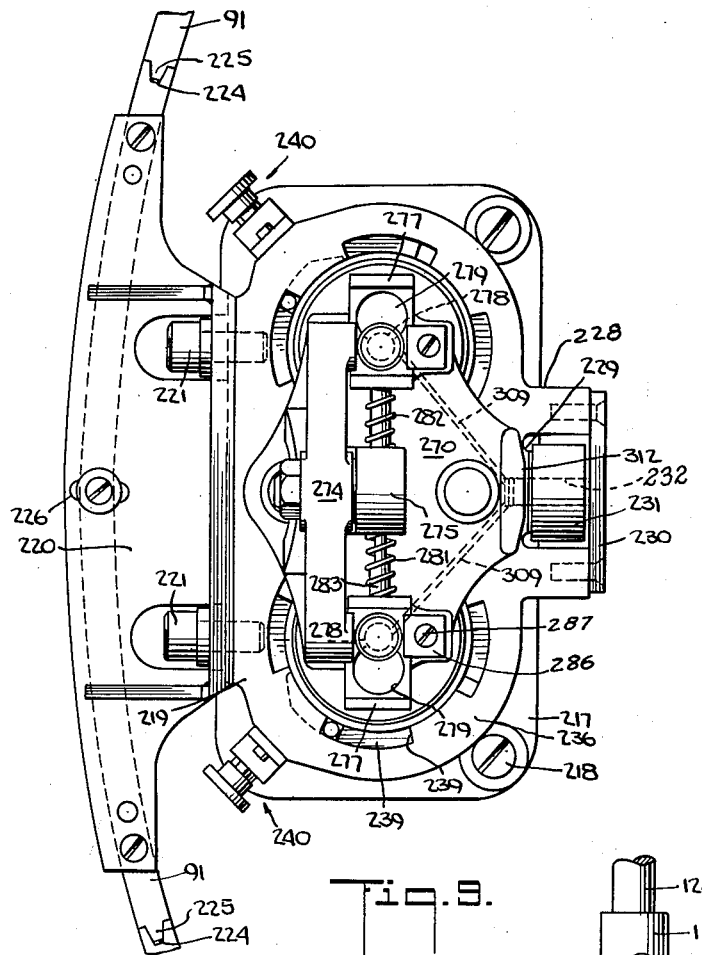
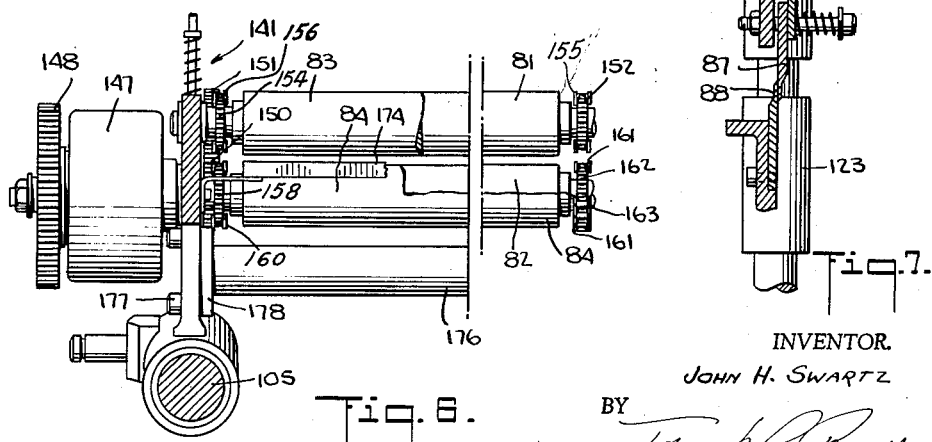

Feb. 25, 1964 J. H. SWARTZ 3,121,917
APPARATUS FOR CONTINUOUS AND AUTOMATIC
MOLDING OF SEPARATE ARTICLES
Filed April 24, 1961 9 Sheets-Sheet 7

INVENTOR.
JOHN H. SWARTZ
BY
Frank C. Bower
His ATTORNEY

INVENTOR.
JOHN H. SWARTZ
BY Frank C. Bower
his ATTORNEY

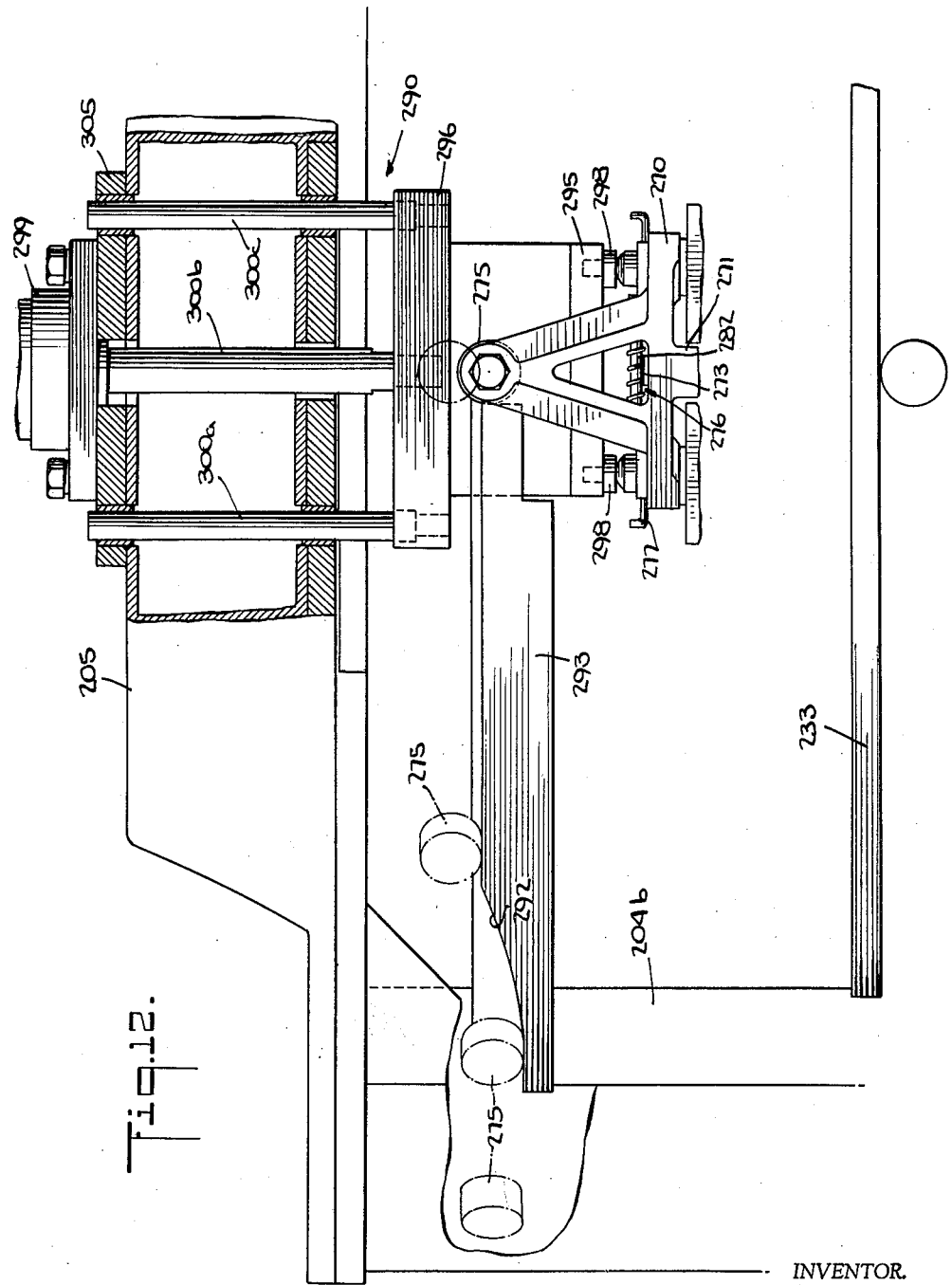

United States Patent Office 3,121,917
Patented Feb. 25, 1964

3,121,917
APPARATUS FOR CONTINUOUS AND AUTOMATIC MOLDING OF SEPARATE ARTICLES
John H. Swartz, Gladwyne, Pa., assignor to Linear Incorporated, Dallas, Pa., a corporation of Pennsylvania
Filed Apr. 24, 1961, Ser. No. 105,054
10 Claims. (Cl. 18—20)

This invention relates to automatic molding apparatus for continuously molding of discrete articles from a strip of curable plastic material and is directed particularly to the molding machines and the individual molding heads. The invention is also directed to the means for feeding curable plastic material to the molding machines.

An object of the invention is to provide an automatic molding machine versatile in the type of article being molded and easily and quickly adjusted to molding different types of articles.

Another object of the invention is to provide a molding die and heating means that accurately controls the temperature of the die and maintains the close tolerances of the position of the dies.

Another object of the invention is to provide an automatic molding machine which can mold several different articles at the same time.

Another object of the invention is to provide a molding cartridge that may be readily removed from the molding machine for adjustment.

Another object of the invention is to feed a continuous strip of curable plastic material to the molding machine and return the unused piece to the material supply.

Other and further objects will be apparent from the following description taken in connection with the drawings in which:

FIG. 7 is a fragmentary side view of the cutting knives;

FIG. 8 is a front view of the molding heads;

FIG. 9 is a top view of the molding heads;

FIG. 12 is a front view illustrating the mold depressor and the cams and rails.

Figure 1:
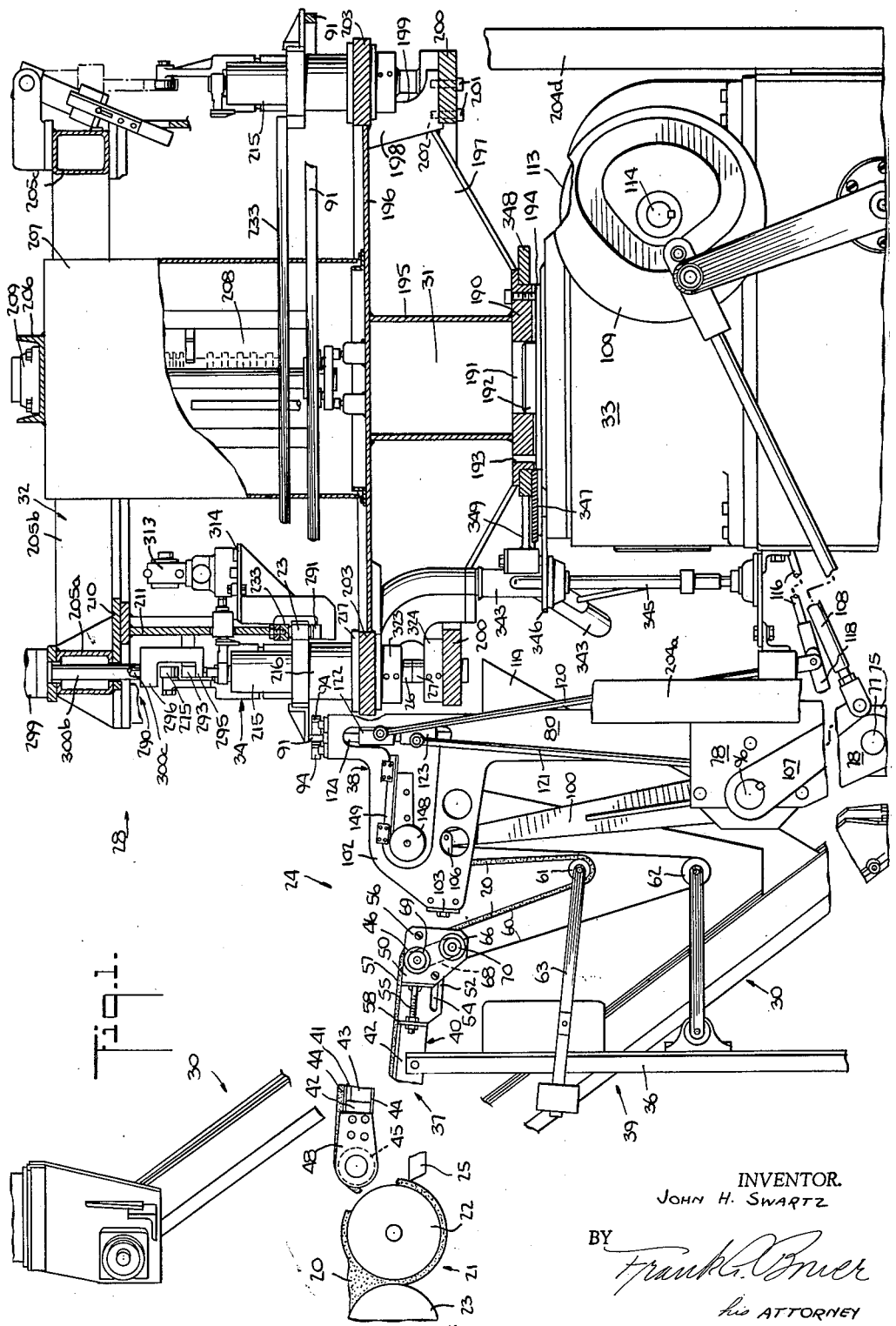
FIG. 1 is a fragmentary side view of the material supplying and feeding apparatus and a fragmentary and sectional side view of the molding machine.
Figure 2:
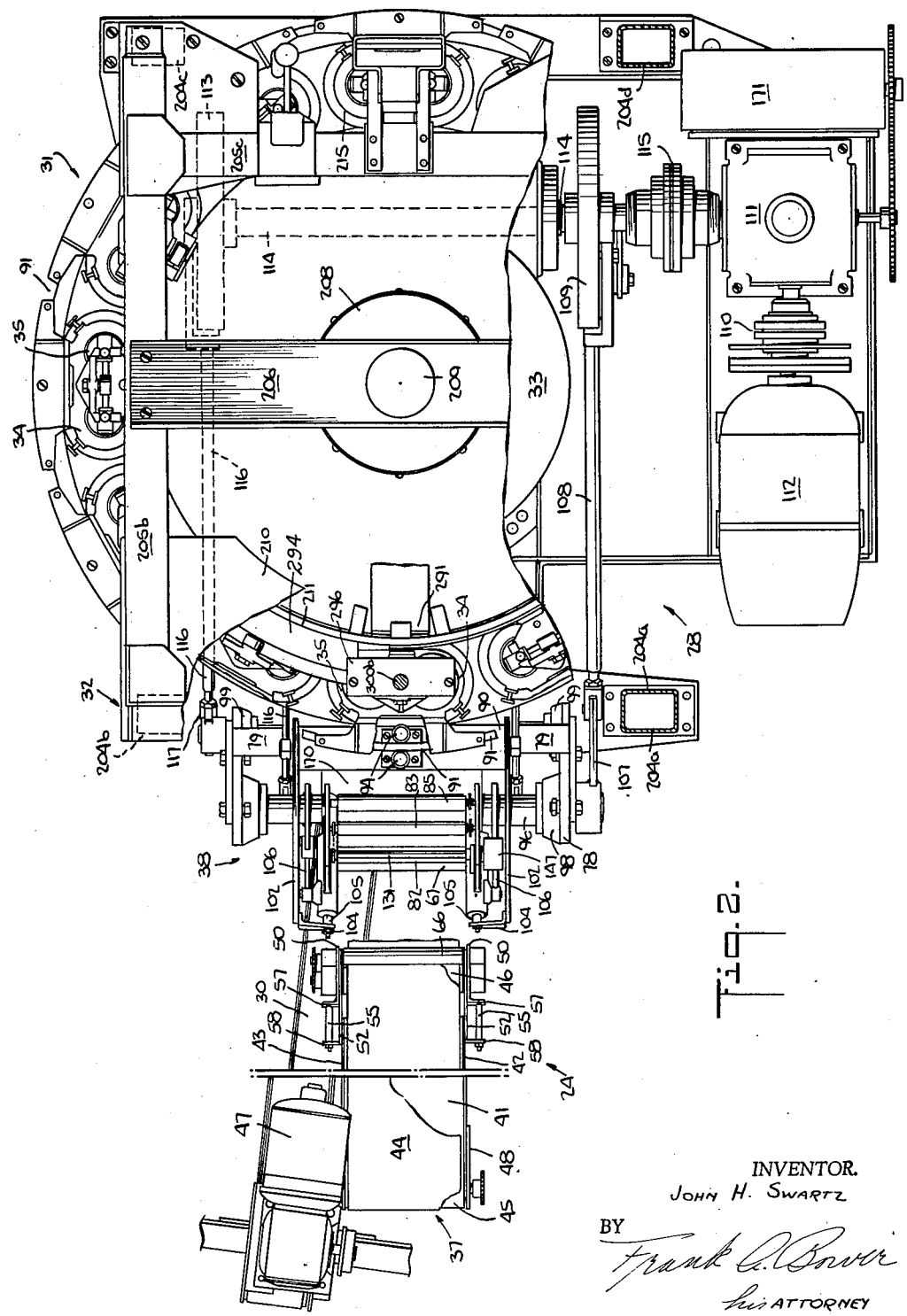
FIG. 2 is a top fragmentary view of the material feeding apparatus and the molding machine.

Referring to FIGS. 1 and 2 the plastic material is initially subjected to a mixing and milling operation which thoroughly mixes the ingredients and plasticizes the ingredients without affecting the properties of the ingredients. This mixing and blending may be accomplished by conventional means, such as a two roll mill, as indicated at 21. The plastic material 20 may be thermoplastic, thermosetting or rubbery material.

The molding composition forms a band of material on the roll 22. Knives 25 or rotating cutters at the sides or ends of the roll sever a strip 20a of a given width from the roll. The thickness of the strip is determined by the spacing of the rolls 22, 23. The strip of plastic material is continuous and is continuously fed from the roll 22 to the strip feeding means 24. The strip feeding means accumulates the strip of material and intermittently feeds the end of the strip between the open dies 26, 27 on the molding machine 28. The dies close on a small portion of the inserted end leaving a large portion of unused material. The stamped end is withdrawn from the dies and severed from the strip. The severed end is returned by the conveyor 30 to the roller mill.

The dies 26, 27 are mounted on a turntable 31 of the molding machine 28 and are moved circumferentially through a molding or curing arc to a die or mold opening position where the dies are separated for removal of the molded article. The dies are rotated to an unloading position and the molded article is removed from the molding machine. The dies then are moved to the loading position where the strip of material is delivered for a repetition of the cycle.

Referring to FIGS. 1 and 2 a general side view and partial sectional views of the molding machine 28 and the strip feeding means 24 are shown. The molding machine 28 has a stationary tubular frame 32 and a stationary base 33. The stationary base supports the drive mechanism and turntable on which the molding heads 34, 35 are mounted in pairs. The stationary frame supports cam rails or tracks and actuating mechanisms controlling the molding heads and other components. The strip feeding means is separately supported and separately coupled to the drive mechanism and to the turntable.

The turntable 31 supports twelve pairs of molding heads 34, 35 and rotates intermittently to repetitively present the heads to a succession of operations. These operations are closing the molding heads, partially curing the material, exhausting volatiles, completing the molding, opening the molding heads for discharge of the molded article, discharging the molded article, and presenting the open molding heads for receiving the strip of plastic material.

The strip feeding means 24 comprises a strip conveyor 37 and a feeding mechanism 38. The strip conveyor 37 is mounted on a leg-type support 39 resting on the floor and comprises a frame 40 having a belt supporting tray 41 and side members 42, 43 and a belt 44 mounted on two rotatably supported rollers 45, 46. The rollers are mounted at opposite ends of the side member with the belt supporting tray in between. The first roller 45 is coupled to the drive of the mill. The speed of the drive mill is controlled by the upper dancer roller 61. The second roller 46 is an idler and is driven by the belt. The strip of material 20 to be fed to the molding machine rests on the belt and is conveyed toward the feeding mechanism. The strip conveyor is spaced from the feeding mechanism to provide for a loop of the strip between the conveyor and feeding mechanism in order to accumulate a supply of material for the intermittent feed of the mechanism. The first or drive roller 45 is rotatably mounted in the plates 48 securely fastened to the side members 42, 43 at the mixer end of the strip conveyor.

The idler roller 46 is rotatably mounted in plates 50 adjustably attached to and forming part of the side members 42, 43 by means of the fixed plates 52 welded to the side members. The fixed plates have slots 54 extending longitudinally to the direction of travel of the belt to adjust the position of the rollers by means of the threaded pins 55 fastened to the flanges 57 of the plates 50 and extending through and adjustably secured to the flanges 58 on the fixed plates 52. The adjustable plates are secured in place by the fastening means 56.

Between the strip conveyor and the feeding mechanism the loop is supported by a dancer belt 60 with two dancer rollers 61, 62 for varying the length of the upper loop of the belt in response to the length of the loop of the strip material. The upper dancer roller 61 is pivotally mounted by a counter balanced arm 63 to the frame 39 and the other dancer roller 62 is also pivotally mounted on the frame 39. As the loop of material increases, the weight increases causing the upper roller 61 to lower increasing the length of the upper loop of the belt. The strip material 20 passes under the counter balanced dancer roller 61 up into the feeder. The dancer belt 60 is supported by the third roller 66 mounted on the strip conveyor and the roller 67 mounted on the feeding mechanism. The roller 66 on the strip conveyor is rotatably mounted in the adjustable plates which also rotatably support the second roller. The third roller is positioned below and forwardly of the second roller to receive the strip material as it drops off of the belt of the strip conveyor. The second and third rollers are dynamically coupled by the chain 68 meshing with the sprockets 69, 70 on the respective rollers. Thus the third roller is driven and as the strip of material is added to the loop the upper loop increases in length. The roller on the feeding mechanism is driven by the intermittently operated drive of the feeding mechanism later described herein. Thus as the loop of material is shortened the loop of the dancer belt is shortened.

Figure 3:
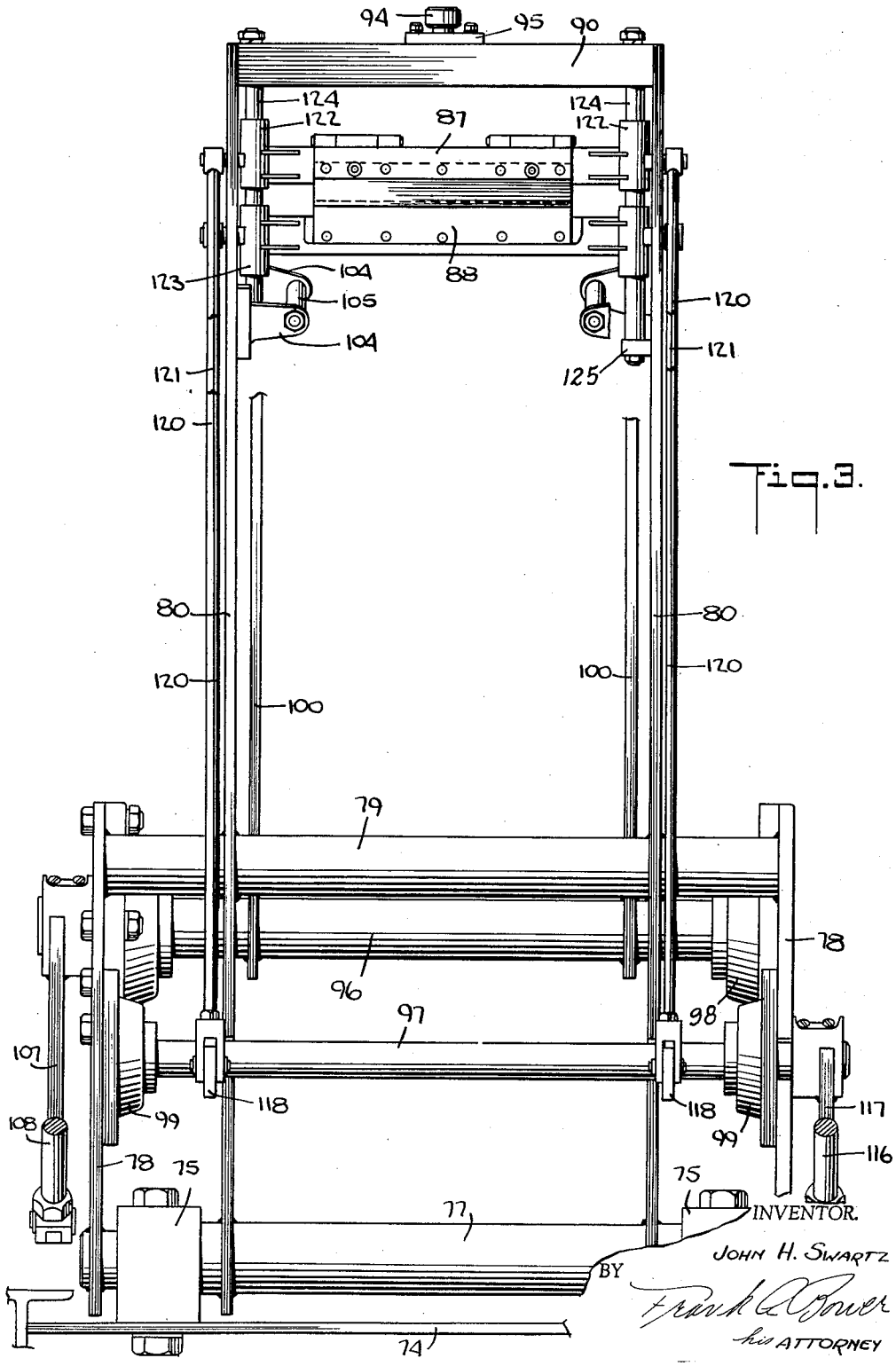
FIG. 3 is a front view of the feed mechanism.

Referring to FIGS. 1 and 3, the feeding mechanism is bolted to a base 74 through two spaced blocks 75. A shaft 77 is rotatably mounted in the blocks and has an enlarged intermediate portion for positioning the shaft axially. Side support plates 78 are fixedly mounted on the ends of the shaft with the blocks in between and extend upward from the base. A support rod 79 is welded to the upper end of the plates to provide additional rigidity and support the members. A supporting feeding mechanism frame 80 is positioned between the blocks and welded to the rotatable shaft 77 and support rod 79 and extends upwardly to slideably support the feed rollers 81-86 and cutting knives 87, 88. At the upper end a crossbeam 90 is connected to the ends of the frame to add rigidity and firmness to the assembly. In the center of the crossbeam are two spaced rollers 94 rotatably mounted in sockets 95 a given distance apart. The function of these rollers is to position the feeding mechanism frame in relation to the molding heads in cooperation with a circular circumferentially extending rail 91 (FIGS. 1, 10 and 11) encircling the molding machine and mounted on the turntable. The rail is positioned between the rollers and moves therebetween as the turntable rotates firmly positioning the frame of the feeding mechanism. The rotatable mounting of the shaft 77 in the blocks 75 permits the frame to respond to changes in the location of the rail and thereby maintain proper relation between the feeding mechanism and the molding heads.

In the side supporting plates 78 are two shafts 96, 97 rotatably mounted in sockets 98, 99 fastened to the plates by any suitable means such as bolts and nuts. Arms 100 are welded to the upper shaft 96 and extend upwardly to actuate the rollers 81–86. The frame 80 has side members 102 integral therewith and extending away from the turntable. A reinforcing strip 103 extends across the far end of the members from the turntable to add rigidity to the frame. Short L-shaped brackets 104 are provided on the inner sides of the side members. Rods 105 (FIG. 5) are securely fastened to the brackets and sloped downwardly toward the turntable. The side members are slideably mounted on these rods and are actuated by the actuating arms 100 through the pivotally mounted links 106.

The rotatable shaft 96 supporting these arms extends through the socket and side supporting plate as illustrated in FIGS. 1, 2 and 3. A lever 107 is mounted thereon to rotate the shaft and is connected by a connecting rod 108 to a rotatably driven cam 109 mounted on the pedestal 33. The pedestal 33 houses the indexing unit driving the turntable in stepped or intermittent movements. The indexing unit is driven by means of shaft 114 extending horizontally through the pedestal and supporting cams 109 and 113 (FIG. 2). Cam 109 is connected to the feeding mechanism and the cam 113 is connected to the cutting knives. The shaft 114 is driven by the main drive motor 112, coupling 110, cone speed reducer 111 and coupling 115. The rollers 81–86 are actuated in timed relation with the turntable 31 through cam 109 and connecting rod 108. The cutting knives 87, 88 are actuated in timed relation with the turntable by means of the cam 113 and the connecting rod 116. The shaft 97 is connected by lever 117 to the connecting rod 116. Rockers 118 are mounted on the shaft with rocker rods 120, 121 at each end. The rocker rods are connected to the upper and lower cutting blades for severing the strip material (FIG. 3). The cutting blades are securely fastened to the sleeves 122, 123 slideably mounted on the posts 124. The posts extend vertically and are fastened to the crossbeam 90 and to angles 125 secured to the frame. The rocker rods 120 on one side are connected to the sleeves 122 of the upper knife 87 and the rocker rods 121 on the other side are connected to the lower sleeves 123. Thus as the shaft is rotated the rockers are moved through an arc to open or close the blades.

The blades are thin with long edges spanning the width of the strip. The edges are at an angle to progressively shear a strip (FIGS. 3 and 7). The action of the cams and rods imparts a quick positive action to the blades for quick severance of the strip.

Figure 4:
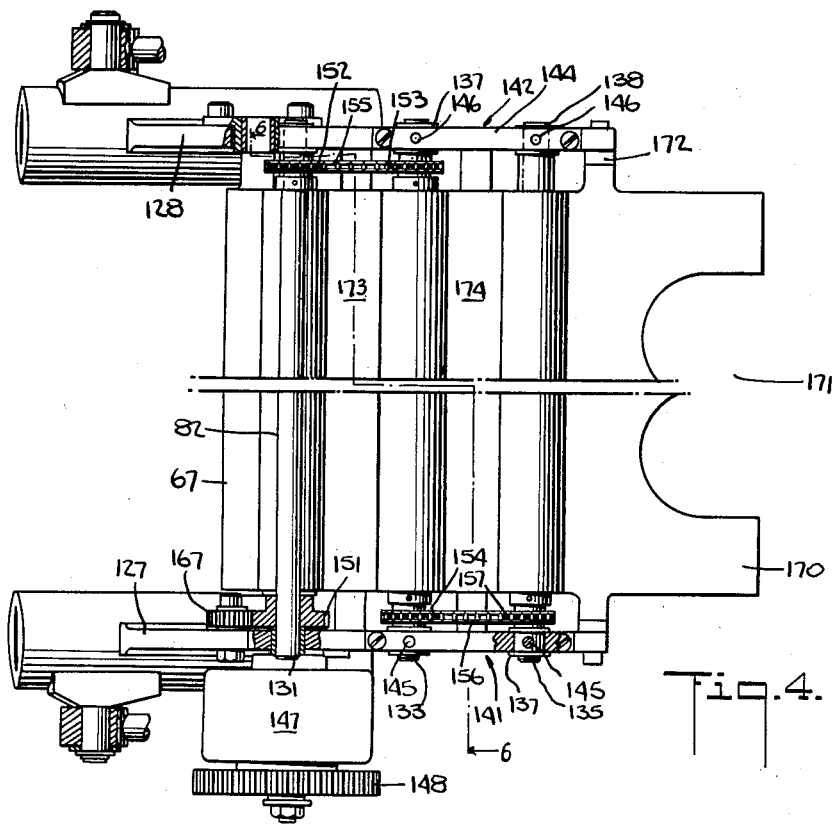
FIGS. 4 and 5 are top and side views of the feeding mechanism.
Figure 5:
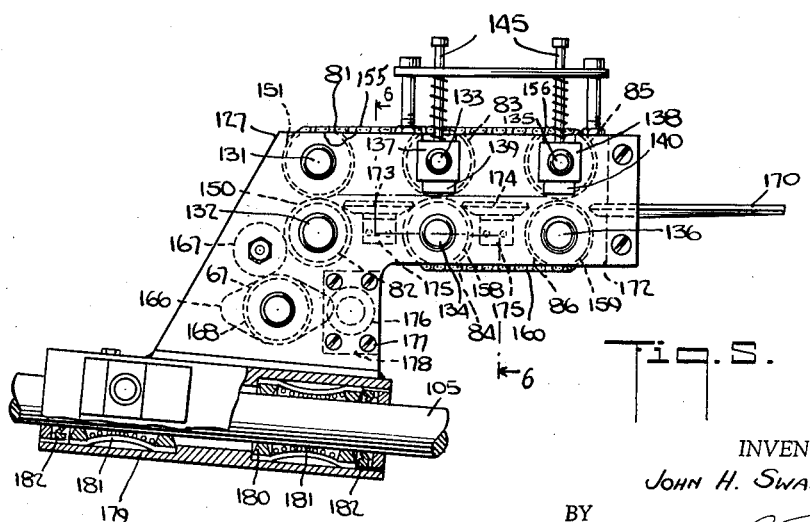
Figure 6:
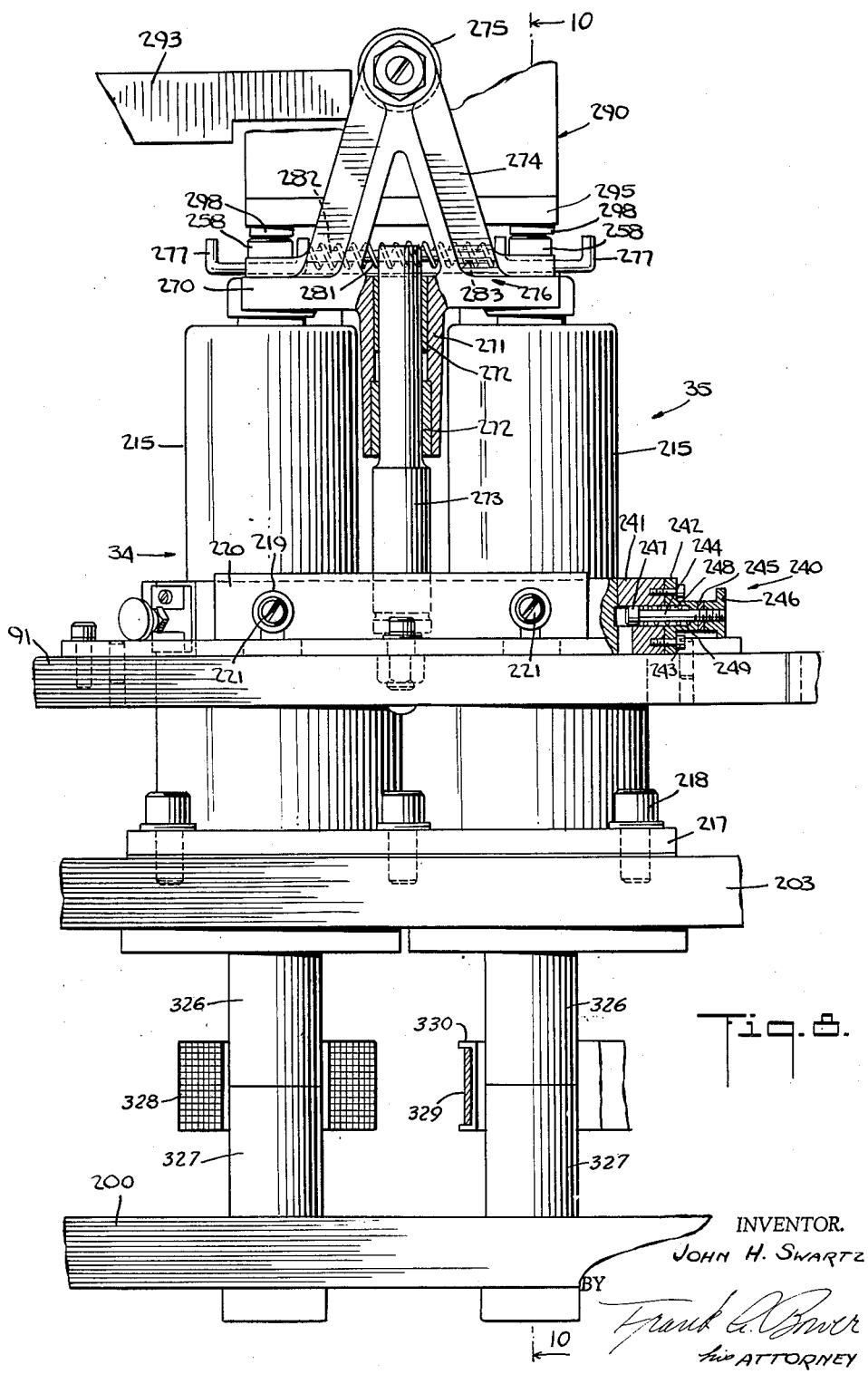
FIG. 6 is an enlarged fragmentary view of the feeding mechanism sectionalized along lines 6—6 of FIGS. 4 and 5.

The feed rollers, as previously described, are slideably mounted on the rods 105 rigidly fastened to the frame by the brackets 104. Attached to the sleeve member are flat generally L-shaped supporting plates 127, 128 (FIGS. 4 and 5). The strip material passes between a set of three upper rollers 81, 83, 85 and a set of three lower rollers, 82, 84, 86. The first pair of upper and lower rollers 81, 82 receives the strip material from the slack loop and feeds it to the second and third pairs. Each of the rollers extends between the spaced supporting plates and is mounted on a respective shaft 131, 132, 133, 134, 135, 136 rotatably fitting in bushings in the supporting plates. The upper rollers of the second and third pairs adjacent the molding machine are adjustably mounted in blocks 137, 138. The blocks are square and fit in slots 139, 140 in the supporting plates. The blocks have flanges fitting snugly against the walls of the supporting plates to guide the blocks. The bushings are mounted in the blocks and the shafts are rotatably mounted therein. Spring loading means 141, 142 are provided on each supporting plate for pressing against the blocks to urge the upper adjustably mounted rollers 83, 85 toward the lower rollers (FIG. 6). On each side horizontal bars 143, 144 are supported above the blocks on posts 145, 146 threaded into the top of a respective supporting plate. Pins extend vertically through openings in the horizontal bars to support the helical springs resiliently pressing against the bars and block.

The lower roller 82 of the first pair is the driving roller and the shaft extends beyond the supporting plate to fit into the overriding clutch 147 mounted on the supporting plate 127. A large gear 148 is mounted on the other side of the clutch to engage a rack 149 mounted on the feeding mechanism frame. The shaft of the driving roller has a gear 150 between the supporting plate and the roller which meshes with a corresponding gear 151 on the shaft 131 of the upper roller. The upper shaft has a sprocket 152 mounted on the other end between the roller has a gear 150 between the support plate and upper roller of the second pair has sprockets 153, 154 on each end with one sprocket coupled by a chain 155 to the sprocket 152 to drive the upper roller. The sprocket 154 at the other end is coupled by a chain 156 to a sprocket 157 on the upper roller of the third pair. Thus the upper adjustable rollers are driven. The lower rollers of the second and third pairs each have sprockets 158, 159 which are coupled by a chain 160 (FIG. 5). These rollers are driven from the drive roller by chain 161 on sprockets 162, 163 on the shafts of the drive roller and lower roller of the second pair (FIG. 6).

The dancer belt roller 67 on the feeding mechanism is driven from the main drive gear through the spur gear 167 and gear 168 mounted on the shaft supporting the dancer belt roller (FIG. 5). The shaft is rotatably mounted in sockets 166 fastened to the supporting plates.

Extending from the forward end of the feeding mechanism is a platform 170 (FIG. 4) for supporting the strip material in a horizontal position after passing between the rollers. The forward portion of the platform has cut out portions 171 through which the dies 26, 27 pass in closing. The platform 170 is fastened to the supporting plates by flanges 172 extending normal to the platform. The upper surface of the platform is about level with the tops of the lower rollers. The rear edge of the platform is beveled to fit the upper surface close to the surface of the third lower roller for a smooth transition of the material.

Intermediate platforms 173, 174 are provided in the spaces between the rollers. These platforms are supported by angles 175 fastened to the supporting plates. The surface of these platforms is level with the surface of the forward platform and the rear and forward edges are beveled to provide an even transfer of material. Below the rollers a tubular brace 176 extends between the supporting plates 127, 128 and is fastened thereto by bolts 177 threading in the flanges 178 on the base for providing additional support and rigidity to the supporting plates.

As previously described the feed rollers are supported by sleeves slideably mounted on rods securely fastened by brackets 104 to the side members 102 of the frame (FIG. 3). The rods are straight and cylindrical in shape and securely fastened at each end. Internal annular shoulders 179, 180 (FIG. 5) are spaced from each end of the sleeve and ball bushings 181 are fitted in each end to engage the rods 105 and support the feed rollers. Ring rubber seals 182 are provided at the outer ends to protect the bearings and slide fit.

Since the rods 105 are at a slight angle to the horizontal the movement of the rollers and platform is slightly downward as it moves toward the molding head. The rack 149 is also at an angle to the horizontal. This downward movement moves the strip material not only in radially but also downward onto the lower die 27.

The overriding clutch 147 connecting the gear 148 to the feed rollers engages only on the retraction of the feeding mechanism from the molding heads (FIGS. 1 and 4). The clutch slips on the forward movement so that the feed rollers do not rotate.

The feeding mechanism operates in the following manner. The cycle may be considered to commence at the time of the closing of the dies when the feeding mechanism is in its most forwardly position. The strip material is around the dies. The cams 109, 113 on the pedestal are rotated and the feeding mechanism is retracted or drawn away from the closed dies 26, 27 (FIGS. 1 and 2). The gear is not in engagement with the rack and is not rotating. The retracting movement withdraws the strip material and the platform 170 from the dies. Breaks are caused along the inner end edge by the molds and the retracting action to withdraw all the material around the die. The gear 148 engages the rack 149 and the overriding clutch 147 is in engaged relation (FIGS. 1 and 4). The feeding mechanism continues to retract rotating the three pairs of rollers 81–86 (FIG. 5) drawing the strip and feeding it on to the platform 170. The punched portion is pushed off the platform 170 by the feed strip and the knives are closed severing the punched portion. The punched portion drops into the return chute 119 (FIG. 1). The rollers in cooperation with the dancer belt roller draw the strip material from the loop reducing the length of the loop. The strip conveyor continues to feed the material repeating the cycle to increase the amount of material. The feeding mechanism is then in the retracted position. When the next empty dies are presented the feeding mechanism is moved forward by the cam. The overriding clutch slips and the feed rollers are locked in position. The strip of material is on the platform and is inserted between the dies. The slope of the rods imparts a slight downward movement. With the material between the dies, the dies close and the cycle is completed.

The molding machine generally comprises a base 33, a turret or turntable 31 and a frame 32 for supporting components above the turntable (FIG. 2). The base is rectangular in shape and supports the driving elements for the feed mechanism and houses the index table for controlling and supporting the turntable. The turntable has a circular base plate 190 with a central opening 191 for fitting on the end of the vertical drive mechanism 192. The base plate has circumferentially spaced openings for drive or indexing pins 193 mounted in the driving table. The base plate rests on an index table 194 rotatably mounted on the base.

The turntable 31 is rigid in construction and comprises a center cylindrical member 195 (FIG. 1) vertically positioned on the base plate, an upper horizontal circular plate 196 and web sections 197 extending radially below the upper plate and from the center member. The web sections support at the outer ends molding head mounting brackets 198 at circumferentially spaced locations. The brackets 198 are positioned vertically and have upper and lower mounting surfaces and holes for supporting ring members. A semicircular notch 199 in the outer vertical edge is provided in each bracket for receiving the end of the strip of molding material. The turntable rotates in a counter clockwise direction.

A flat ring member 200 is mounted on the lower portion of the brackets for supporting the lower molding dies. The ring member is fastened by bolts 201 threaded into the lower mounting holes 202. An upper ring member 203 is provided mounted on the upper portion of the mounting brackets for supporting the movable dies.

The main frame 32 is rectangular in shape and comprises four vertical tubular columns 204a–d and four horizontal tubular beams 205a–d mounted on the top of the columns (FIGS. 1 and 2). The frame supports various components that are stationary in relation to the moving molding heads for controlling the operation of the molding heads and the molding cycle.

An intermediate crossbeam 206 extends between two opposite parallel beams for supporting the casing 207 for the electrical components 208 and supporting a bearing 209 for the upper end of the vertical cam shaft actuating the electrical switches operating the machine. A generally semicircular plate 210 is mounted on the lower part of the beams to provide in cooperation with a curved vertical extension 211 a stationary support for components cooperating with the molding heads. The extension is welded to and depends from the circular plate adjacent to and radially within the molding heads.

Figure 10:
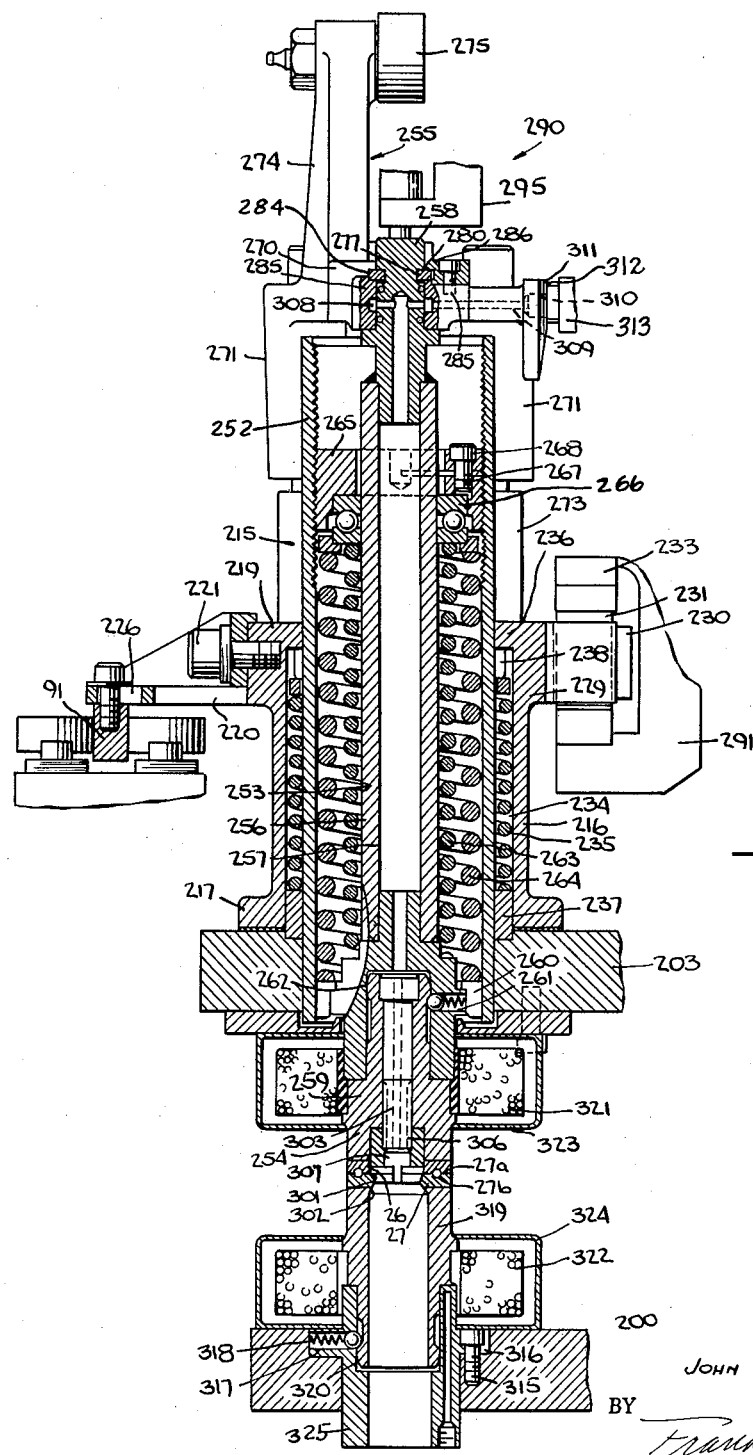
FIG. 10 is a sectional view of a molding head taken along lines 10—10 of FIG. 8.

As illustrated in FIGS. 8, 9 and 10 the molding mechanism is formed into a vertically stationary lower molding die and a vertically reciprocal upper die. Both dies move together with the turntable. The upper die is mounted on a cartridge that is removable from the turntable. The cartridge 215 is reciprocally supported by a housing 216 having two sections of a generally cylindrical shape. A cartridge is mounted in each section so that a dual mounting is provided and two articles are processed and molded simultaneously. The housing has a flange 217 with bolts 218 passing therethrough and threaded into the upper ring member 203. The flange extends around the housing and six bolts are provided. On the front of the housing at the upper end is a boss 219. A bracket 220 extending horizontally from the housing is attached to the boss by the bolts 221. The bracket extends circumferentially and a segment of the curved rail 91 is secured at the periphery of the bracket by the bolts extending through openings 226 in the bracket and threading into the rail segment. The center opening is in the shape of a radial slot to provide for rails of different curvatures (FIG. 9). The ends of each rail segment have a slot 224 and a projection 225 to overlap the ends of adjacent rail segments to form a firm interlock and a continuous circumferentially extending rail. The rail 91 fits between the rollers 90 on the top of the feed mechanism to position the mechanism in relation to the die members.

At the rear the housing has two spaced projections 228 extending horizontally from the housing and an intermediate boss 229. A strap 230 is bolted to the ends of the projection and extends therebetween. A roller 231 is mounted on a shaft 232 between the projections. The shaft is mounted between the intermediate boss and the strap to rotatably support the roller. The roller contacts a circumferentially extending rail 233 radially inside of the molding heads. Each housing section supports a molding head or cartridge and is spaced from the molding head to form annular spaces 234 for the helical spring 235 (FIG. 10). The upper ring member 203 has an opening 227 for each molding head and the head extends through the opening. In the annular space 234 around the cartridge a collar 237 is fitted to provide a seat for the helical spring 235. Each housing section has a slotted upper flange 236 for guiding the cartridge 215 and permitting the interlocking of the cartridge 215 and the housing section 216 by the circumferential keys 238 on the cartridge fitting through the slots 239 and by twisting the head turning the keys into registry with the segments of the flange. On each housing section pin-type locks 240 are mounted in the housing section to extend into the annular space 234 and prevent rotation of the molding head (FIGS. 8 and 9). A flat boss 241 is provided in the front corners of the housing section and a U-shaped strap 242 as a stem holder and guide is mounted on the boss and fastened thereto by bolts 243 threaded into the boss. The stem 244 has a threaded end with a washer 245 and a manipulating head 246. The stem has an enlarged tip 247 snugly fitting in the bore 248 for fitting into the annular space under the pressure of the helical spring 249 locking with the cartridge.

Referring to FIG. 10 the cartridge 215 essentially comprises an outer cylindrical member 252 and an inner plunger means 253 extending the length of the cartridge. The plunger means supports the die member 254 at one end and at the other end locks with the actuating mechanism 255. The plunger means comprises a long tubular member 256 having an axial bore 257. At the upper end a pin or pin portion 258 is formed as part of the tubular member. The pin 258 extends from the end of the cylindrical member to fit in the actuating mechanism 255. At the other end a die holder 259 extends from and forms part of the tubular member. The die holder forms a socket for the die member. A collar 260 fits around the die holder 259 and in the cylindrical member to axially align the plunger 256 and the die member 254. A detent 261 in the form of a spring and ball extends through the socket and engages a bead 262 on the die member.

Two helical springs 263, 264 are positioned in the cartridge and press against the die holder and collar for applying pressure to the die. At the upper end of the head a spring load setting member 265 threads in the cylindrical member. The springs seat on the bearing 266 rotatably mounted on the load setting member. The load member has a lateral slot 267 extending part way through the member and a bolt 268 threaded in one part to lock the load member at the desired setting.

The actuating mechanism is the form of a yoke slideably mounted on pins extending vertically from the housing. The yoke moveably supports the plunger means. On lifting the plunger and die the collar 260 and die holder 259 press against the helical springs (FIG. 10). The springs in turn press against the spring load setting member which is fastened to the cylindrical member. The upward force is transmitted to the housing through the keys and flange. On depression of the plunger by a force applied to the pin or pin portion the force is transmitted directly through the plunger to the die and against the lower stationary die. On the application of no force to the plunger the dies are normally closed and the helical springs press the upper die against the lower die. The outer helical spring 235 seated on the fixed ring or collar 237 exerts an upward force on the keys and supports the cartridge.

The pin fits through the yoke coupling the cartridges together to function in unison. The yoke comprises a cross member 270 (FIG. 9) extending from the plunger of one cartridge to the plunger of the other cartridge. Two sleeves 271 extend vertically downward from the cross member with bushings 272 to slideably fit on the guide pins 273 mounted on the housing between the two sections. The guide pins are spaced on opposite sides of the housing to provide space for the plunger locking means. A V-shaped roller support 274 extends vertically above the cartridges. A roller 275 is mounted at the upper end of the V-shaped member for engaging cam surfaces and lifting means.

The locking means 276 comprises two keys 277 (FIG. 9) each having two openings 278, 279, one smaller than the diameter of the respective pin and fitting in grooves 280 formed in the side and one greater than the diameter to permit attachment and removal of the keys. The keys 277 are held in locked position by the helical spring 281 positioned between the keys and urging the keys into locking relation. The spring is supported by the shafts 282, 283 extending from the keys in telescopic relation with one another. The keys are held in the cross member by fitting in the grooves 284 (FIG. 10) of the bosses 285 extending from the cross member and the pieces 286 attached to the crosspiece by the bolts 287 (FIG. 9). By removing these pieces the keys can be removed and the cartridges separated from the yoke.

Figure 11:
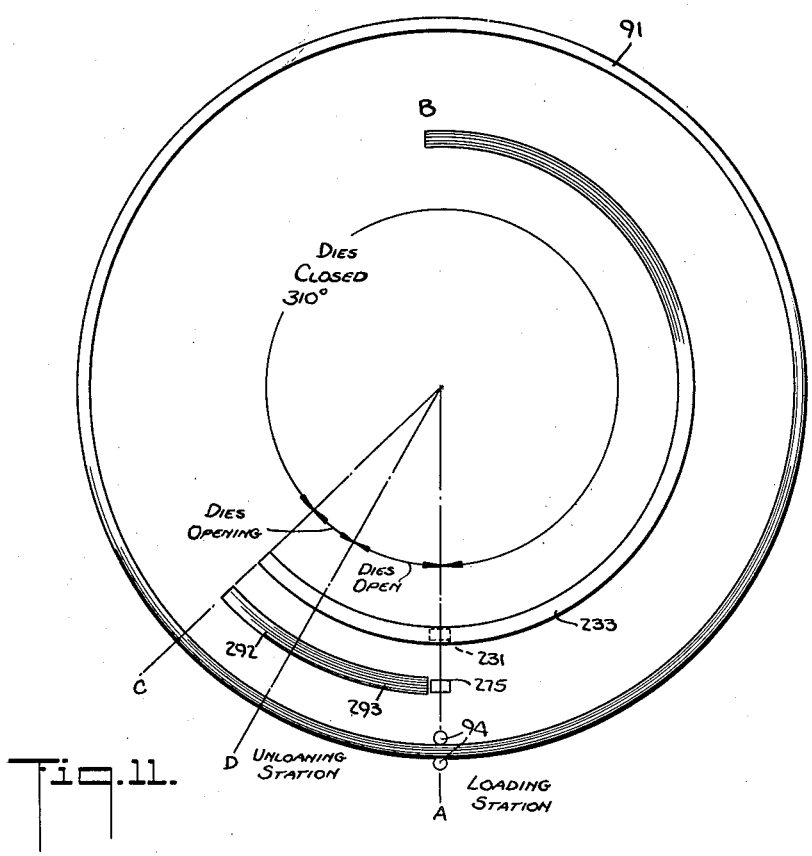
FIG. 11 is a diagrammatic illustration of the molding stations.

The turntable rotates passing the molding heads through the successive operative and molding steps. After the dies are cleared the dies are in an open position. The strip material is inserted between the dies and the molded material is cut out. The strip material is retracted and the excess cut off and dropped into the return chute 119. The dies are held closed by the force of the helical springs and the molding heads rotated while the plastic is fully or partially cured. The dies remain closed until they are opened just prior to the unloading of the dies. The dies are opened and the article removed. The dies are closed by the force of the helical springs and by the pressure applied by the mold depressor 290. At the loading station A and frame 80 of the feeding mechanism is held in position by the rail 91 on turntable positioned between the rollers on the feed mechanism frame. The roller 231 on the housing is positioned between the rail 233 and the support column 291 (FIG. 10). Thus the housing is held in a precise position vertically and the feed mechanism held in relation to the dies. As the upper roller 275 on the cartridge moves from between the mold depressor, the cartridges are free of external pressures and the molding pressure is applied by the helical spring. The inner roller 231 continues to bear against the inner rail 233 (FIG. 11). At B approximately 180° from the loading station the inner rail 233 terminates and the inner roller 231 is unengaged. The dies remain closed. At station C the upper roller 275 engages the sloped surface 292 of the cam rail 293 and the cartridges with the dies are raised and the article discharged or unloaded at D. The mold heads continue to move to repeat the molding cycle.

The inner rail or cam track 233 extends over an arc of approximately 247°. The track 233 commences at the same position as the opening cam rail 293 and extends up to the mold head unloading station. The inner rail or cam track is mounted on the lower edge of the circumferentially extending frame member 211 in any suitable manner to position the lower surface in an even and precise position over the length of the rail.

The cam rail 293 is rectangular in cross section and is mounted on the circumferentially extending vertical frame member 211 by brackets 294 positioned underneath the rail.

Referring to FIG. 12, the mold depressor 290 has a generally U shape with a lower plunger engaging member 295 and an upper member 296. The distance between the upper and lower members is greater than the diameter of the roller and the cam rail. The mold depressor has a substantial length in order to span the distance between the cartridge plungers. The lower member 295 has two threaded holes spaced the distance the cartridge plungers are spaced. Tappets 298 are threaded in these holes and project to engage the tops of the pins of the cartridge plungers. The upper member is attached to an actuating air cylinder 299 by three shafts 300a, b, c, mounted in the upper member and extending through one of the horizontal beams 205 of the main frame. The center shaft 300b connects the mold depressor to the air cylinder 299 mounted on the plate 305 welded to the upper surface of the beam. The end shafts 300a, 300c are slideably mounted in bushings to guide the mold depressor.

Referring to FIG. 10 the dies 26, 27 are conventional and the lower die 27 has a facing surface 27a with the semicircular groove 27b for holding the material to be molded. The die 27 has a central opening formed by two annular beveled surfaces 301, 302 with the upper surface 301 at an angle facing the upper die and a lower surface 302 expanding the passage through the die.

The upper die has a matching facing surface. An inner core 303 is mounted inside the upper die member and extends below the facing surfaces of both die members when the dies are closed. The inner core member has a beveled surface mating with surface 301 to provide for alignment of the dies.

The core member is held in place by a bolt 306 extending through the die member. The bore and bolt have central air passages 307 communicating with the bore 257 of the plunger. The bore 257 extends upwardly through the pin portion.

The pin portion has radial passages 308 extending lateral to the bore to communicate with the passage 309 in the crosspiece (FIG. 9). A passage is provided for each plunger and extends at an angle to the radial to the bore or recess 310 in the boss 311 on the crosspiece. The boss has a sealing surface 312 which engages the sealing surface of the air supply 313 as the molding heads pass (FIGS. 1 and 10). The air supply provides compressed air in timed relation with the closing of the dies to clear the unused center piece from the lower die through the lower bore provided therein. The air supply is mounted on a bracket 314 welded to the vertical frame member.

The lower die holder 325 is mounted in an opening in the lower ring supporting member 200 and secured by bolts 315 extending through the flange 316 (FIG. 10). The flange also has a radial bore 317 for a detent 318 formed by a spring and ball. The flange is mounted flush in a circular recess in the ring member with the spring of the detent engaging the wall. The die member 319 telescopically fits in the die holder 325 and has a circumferential bead 320 into which the ball of the detent seats to hold the die member in place.

Induction coils or windings 321, 322 (FIG. 10) encircle the upper and lower die holders and members to heat the dies and cure the material in the mold cavity. The windings are in metal casings 323, 324 fastened to the upper and lower ring members 203, 200 respectively. Each casing has terminals for connecting the windings to an alternating current supply. The current supplied is controlled by a control circuit to provide sufficient heat at the proper temperatures to cure the plastic material.

The induction coil on each mold cavity permits an accurate control of the temperatures of each mold cavity. The coils in this embodiment will heat the cavity over a range of 250° F. to 400° F. A fine control of the temperature of the mold cavity may be attained by including a thermistor unit in the die member. The separate induction coils for each set of dies provide for separate adjustment of each pair to accommodate for different mold characteristics. Temperature control may be attained at 350° F. in the range of ±3° F. Thus a close control of the temperature is secured and adjustment and adaptation of the heating of the dies by the coils to the characteristic of the dies. The heating by the induction coils is limited to the die and die member thereby avoiding the undesirable effects of a general heating of the mold head on the alignment of the die cavities. Thus the cavities are held in alignment during the molding operations.

Other die configurations may be used as illustrated in FIG. 8 in which the upper die 326 does not have a core member and a single induction coil 328 encircles the dies 326, 327. Instead of induction heating dielectric heating may be used, as illustrated on the other molding head in FIG. 8. The dies 326, 327 are surrounded by a single copper band 329. The band is connected to a high frequency oscillator which creates a high frequency field within the space encompassed by the band. A non-magnetic mounting 330 supports the band. The field does not heat the metal dies but does dielectrically heat the non-conductive plastic material. Thus the heat is restricted to the molding dies and particularly to the molded material.

Figure 13:
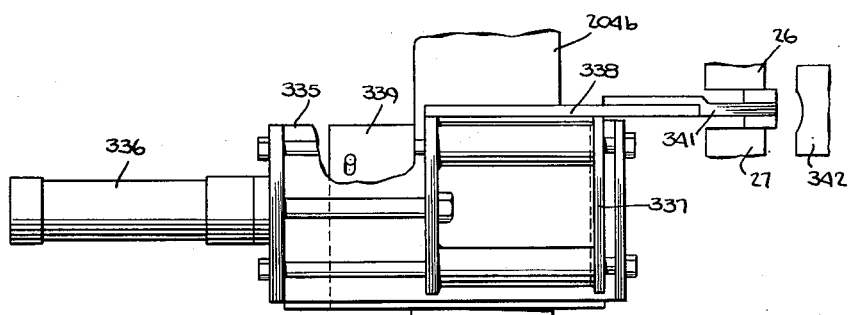
FIG. 13 is a side view of the mold unloader.

The articles are removed from the dies at the position D (FIG. 11) by the article removing means mounted on the vertical column 204b and extending radially toward the molding heads (FIG. 13). The article removing means comprises a frame 335 fastened to and supporting the air cylinder 336. A reciprocal armature 337 is mounted on the frame to move to and from the air cylinder. The armature carries a support 338 for the members clearing the molds. The frame is attached to the column by the bar 339 welded thereto and bolts (not shown) threaded into the frame. On the end of the armature a brush 341 is attached for dislodging the molded article and sweeping the articles into the chute 342 mounted on the turntable. The article drops into the L-shaped conduit 343 (FIG. 1) for delivery to a receptacle. The molding heads may mold different size articles. The molding heads in one quadrant may mold articles of a different size from the molding heads in one of the other quadrants. The air cylinder is actuated in timed relation to the turntable to move the brush between the dies when they are open and in position at the unloading station.

The conduit is pivotally mounted to rotate to deliver the molded article to different receptacles corresponding to the size of the article (FIG. 1). The conduit is pivotally mounted on a support 345 and plate 346 fastened to the base 33 and drawn to one position by a spring 347. A cam 348 is mounted on the circular base plate 190 to actuate a cam follower 349 pivotally attached to the base and conduit to swing the end of the conduit over a selected receptacle.

The unused material of the strip 29a is returned by chute 119 to a conveyor 30 which is driven by motor 47 (FIGS. 1 and 2). The materials drop into the mixer for recombination into a strip of material.

It is thus seen from the foregoing description of the molding machine that it is readily adjustable to molding articles of one size or having molds of a given sector or quadrant to mold articles of different sizes.

The feed mechanism positions the strip of material so that the dies close along the inserted edge. Thus on the retraction of the strip material by the feed mechanism the material is pulled away from the dies without leaving any material exterior to the dies. The rail 91 and rollers 94 position the feed mechanism so that this stamping operation occurs as desired. The rail 91 inserted from each set of molding heads is adapted to properly position the feed mechanism (FIGS. 1 and 2). Thus for one sized article the rail 91 would be of one shape and for another sized article it would be of a different curvature. Thus each molding head is independently adapted for the particular size die.

The temperature created in the plastic material by the induction heating coils or the dielectric strip may be adjusted to fit the desired mold size. Thus each mold head may be individually adapted to the particular die sizes. The temperature is preferably applied over the arc that the plastic material is maintained by the dies and up to the unloading station D. At the unloading station the molding machine is adapted to differentiate between the different sized articles by adjustment of the discharge conduit 343.

During the molding cycle and preferably shortly after the mold closes and heat is applied, the die 26 is slightly relieved to permit the escape of the volatiles from the plastic material. This may occur by the roller 275 engaging a cam. The induction coils are supplied with a 60 cycle current for heating the plastic material.

The molding heads have the cartridges which are readily removed from the molding machine so that the spring pressure may be adjusted for the particular molding operation to be performed. This means that spare cartridges may be provided and adjusted, and as the cartridges are removed properly adjusted cartridges may be inserted while the removed cartridges are being adjusted. It also permits a more accurate adjustment of the spring pressure by the use of a calibrator which is separate from the molding machines.

Further, the use of the induction or dielectric type heating permits the adjustment of the mold heads at the ambient temperature. This eliminates the problem of cavity misalignment due to the warpage of the die supporting parts due to the heating by steam. The die parts retain the temperature at which they were adjusted throughout the molding operation. Further, the induction heating permits, as previously described, a close control of the molding temperatures.

Thus the machine may be readily set up for a different sized molded article. The lower fixed die is readily replaced by pulling out against the three spring loaded ball detents and reinserting the proper sized lower fixed die for the next molding operation.

Typical preferred materials formed into strip material fed to the molding machine and molded are as follows:

*Example I*

A typical composition adaptable to molding by this process is compounded of the following ingredients:

| | Parts |
|---|---|
| Butadiene-acrylonitrile elastomer | 100 |
| Zinc oxide | 5 |
| Carbon black | 75 |
| Tributoxy ethyl phosphate plasticizer | 20 |
| Dipentamethylenethiuram tetrasulfide | 2 |
| Stearic acid | 1 |

These ingredients are blended in a Banbury mixer, two-roll rubber mill or other mixing apparatus until a smooth, homogeneous mix is obtained.

The mixed compound has a slightly rubbery, putty-like consistency which, when warmed above room temperature, not only becomes tacky or sticky, but also starts to cure or set up. This compound may be cross-linked or vulcanized for 15 seconds at 340° F. to produce a finished product.

It is necessary, therefore, to protect the cut off portions of the ribbon from any heat built-up resulting from contact with the heated portions of the molding process means. This may be accomplished in three ways:

(1) Rapid retraction of the ribbon from the molding means immediately following the blanking operation.

(2) Rapid return of the unused portions of the molding material to the plasticizing means.

(3) Cooling of the portions of the plasticizing means in contact with the molding material to extract any accumulated heat from it.

*Example II*

Another typical example of a molding material adaptable to this process is compounded of the following ingredients:

| | Parts |
|---|---|
| Silicone gum | 100 |
| Benzoyl peroxide | 3 |
| Silica filler | 50 |

This molding material, in its uncured condition, is extremely soft and tacky and is scarcely self-supporting and ideally suited for processing by this molding method. This compound can be cured for 28 seconds at 290° F. to produce a finished product.

*Example III*

Another typical example of a molding material adaptable to this process consists of the following ingredients:

| | Parts |
|---|---|
| Chloroprene gum | 100 |
| Zinc oxide | 5 |
| Extra light calcined magnesium oxide | 4 |
| Semi reinforcing furnace black | 140 |
| Butyl oleate | 10 |
| 2-mercaptoimidazoline | 1½ |

This material illustrates a stiff condition of consistency in its uncured state, but it is still readily processable by the claimed molding process. This compound can be cross-linked in 32 seconds at 348° F. to produce a finished product.

It is thus seen from the foregoing description that an economical handling and molding of plastic articles is attained by the return of unused portions for reincorporation in the material supply and by the ready adaptation of the molding machine to the molding of various sized articles.

This application is a continuation in part of application 748,859 filed July 16, 1958 and now Patent 2,980,962 granted April 25, 1961.

I claim:

1. A molding machine comprising a base, a turntable mounted on said base, molding heads with facing dies mounted on said turntable and adapted to mold articles of different sizes, means for intermittently rotating said turntable about an axis to present said heads at a material delivery station and an article discharge station, material feed means at said delivery station, interlocking means at said material delivery station coupling said mold heads and said material feed means for radially adjusting the position of said material feed means to the particular size die at the station, and means at said article discharge station to separate the delivery of different sized molded articles.

2. A molding machine as set forth in claim 1 wherein said material feed means delivers material in sheet form edgewise between the facing dies, and said interlocking means for adapting said material feed means to the dies at the station comprises supporting means for adjustably mounting said material feed means in relation to said turntable and interfitting means on said material feed means and said turntable for coupling said material feed means to said turntable to position said feed means in relation to the dies of a given molding head presented for receipt of material.

3. A molding machine as set forth in claim 2 wherein said interfitting means comprises rail segments extending circumferentially on said turntable and roller means on said material feed means engaging said rail segments to adjust the position of said material feed means to a given relation to the dies of the molding head at the material delivery station.

4. A molding machine as set forth in claim 1 wherein said molding heads have cartridges supporting the movable die, said cartridges having a tubular casing, a plunger and a spring pressing against said plunger and a seat for the spring adjustably mounted in the tubular casing being removable from the die head for adjustment of the molding pressure.

5. A molding machine as set forth in claim 1 wherein said molding heads have inductive heating means for heating the molding material while maintaining the heating of the molding heads to a minimum.

6. A molding machine as set forth in claim 5 wherein means are provided to independently control the heat supply to a respective molding head.

7. A molding machine as set forth in claim 1 wherein said molding heads have dielectric heating means for heating the molding material while maintaining the heating of the molding heads to a minimum.

8. A molding machine comprising a turntable intermittently rotated through specified arcs to permit molding operations, molding heads on said turntable and extending parallel to the axis of the turntable, said molding heads having dies separating along an axis parallel to the axis of rotation of the turntable for insertion of molding strips radially, strip forming means continuously forming and feeding a strip of plastic material, strip feeding means having means for continuously receiving a strip of plastic material from said strip forming means, and reciprocally mounted means for intermittently feeding strip material between said dies in timed relation with said molding heads and withdrawing the strip material after the closing of the dies, said reciprocally mounted feeding means having incremental feeding means for advancing a portion of the strip material opposite to the direction of withdrawal into position for feeding to the following molding head, said strip feeding means having means for receiving said continuously fed strip and intermittently accumulating the stored strip for rapid delivery to the feeding means.

9. A molding machine as set forth in claim 8 wherein said strip feeding means continuously supports the strip of plastic material from a strip forming means until delivery to the molding heads.

10. A molding head cartridge separable as a unit from a molding machine for adjustment to a desired setting comprising a tubular cylindrical member, a plunger axially positioned within said tubular member and having a pin portion at one end and a die holder at the other end and a bore, a spring load setting member positioned within and adjustably secured to said cylinder member to be removed therewith, spring means mounted in said tubular member to be removed therewith and bearing against said spring load setting member at one end and against said die holder at the other end to press a die held by said die holder against a fixed die with a predetermined amount of molding pressure.

References Cited in the file of this patent

UNITED STATES PATENTS

| | | |
|---|---|---|
| 917,627 | Lizotte | Apr. 6, 1909 |
| 1,492,510 | De Escobales | Apr. 29, 1924 |
| 1,754,502 | Denmire | Apr. 15, 1930 |
| 1,965,732 | Bisterfield | July 10, 1934 |
| 2,055,742 | Burke | Sept. 29, 1936 |
| 2,058,880 | Hunt | Oct. 27, 1936 |
| 2,166,409 | Gora | July 18, 1939 |
| 2,354,029 | Kingston | July 18, 1944 |
| 2,593,668 | Gora | Apr. 22, 1952 |
| 2,881,475 | Wilckens | Apr. 14, 1959 |
| 2,999,531 | Acton | Sept. 21, 1961 |
| 3,007,197 | Grover | Nov. 7, 1961 |